July 24, 1951  J. M. MILLER  2,561,707
TOOL BOX WITH REEL AND APRON
Filed March 22, 1948
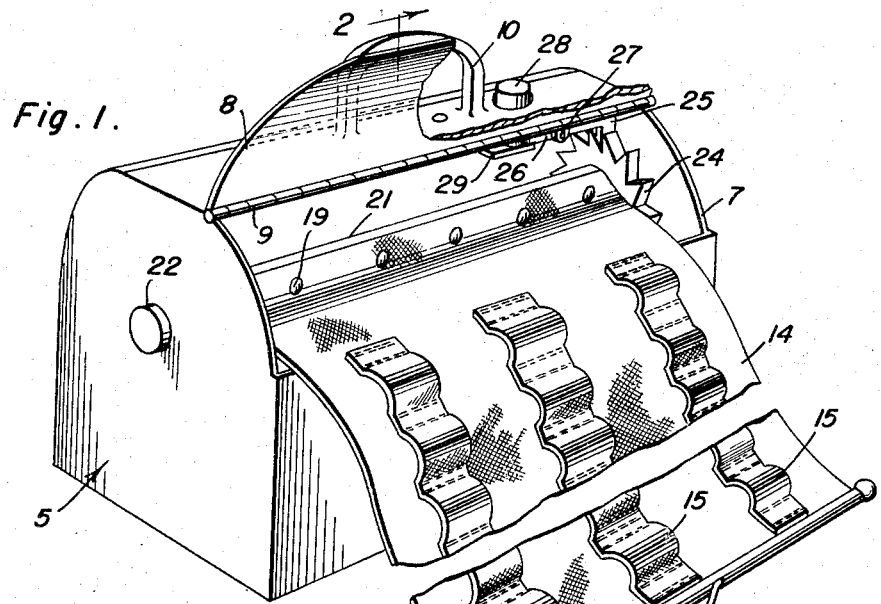
Fig. 1.
Fig. 2.  Fig. 3.
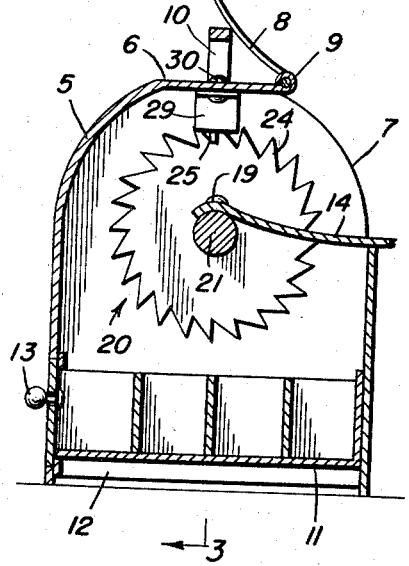
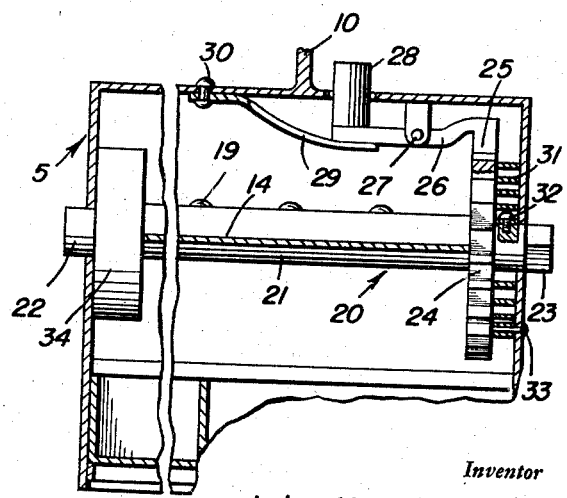
Inventor
John M. Miller
By *Clarence A. O'Brien and Harvey B. Jacobson*
Attorneys Patented July 24, 1951

2,561,707

UNITED STATES PATENT OFFICE 2,561,707

TOOLBOX WITH REEL AND APRON

John M. Miller, Summerdale, Ala.

Application March 22, 1948, Serial No. 16,188

3 Claims. (Cl. 242—107)

The present invention relates to a novel and improved implements carrying and storing box, which is especially, but not necessarily, adapted for use by mechanics and intended to conveniently house a plurality of small hand tools, such as screw-drivers, wrenches, files, saws and so on and so forth.

Although the inventive principles utilized in reducing my concepts to practice may be carried out in structural embodiments other than that herein shown, my principal objective has been to put my ideas into use through the medium of a so-called mechanic's miscellaneous small tools box or kit, and to attain the ends desired by way of a suitable hand-carried box and reel means in the box, said means being adapted to accommodate a rollable apron with tool pockets.

More specifically, the invention has to do with a spring wound reel mounted in an appropriate tool box, there being a push-button and latch arrangement to permit the tool carrying apron to be paid out and reeled back again in a practical and convenient manner.

Other and more specific objects and features of the invention will become more readily apparent from the following description and the accompanying illustrative drawings.

In the drawings:

Figure 1 is a perspective view, with portions broken away and shown in section, showing a tool box constructed in accordance with the invention, the apron being withdrawn to render the tool pockets accessible.

Figure 2 is a central vertical sectional view on the line 2—2 of Figure 1, looking in the direction of the arrows.

Figure 3 is a longitudinal vertical sectional view on the line 3—3 of Figure 2, looking in the direction of the arrows.

Referring now to the drawings by distinguishing reference numerals, the metal or equivalent box, as a unit, is denoted by the numeral 5 and is of any suitable shape and capacity. It should be sufficiently small that it may be readily carried by hand when appropriately filled with tools and equipment. The top portion is flattened as at 6, and is provided on one side with an entrance opening 7 and a suitable lid 8 hingedly mounted as at 9. The numeral 10 designates a hand-grip for conveniently carrying the box from place to place, in an obvious manner. The numeral 11 designates a cellular drawer, which is slidably mounted in place on appropriate guides 12 and provided with a handling knob 13. This drawer may be conveniently employed to accommodate small articles of hardware, such as bolts, nuts, cotter keys, roll tape, and so on and so forth.

The flexible, windable apron is denoted by the numeral 14, and is of canvas, leather or other appropriate sturdy material, and is provided with suitably positioned and fastened straps defining tool holders or pockets 15. The outer end of the apron is provided with a hem 16 for a reinforcing stick 17, and is further provided with an appropriate hand-grip 18.

The inner end of the apron is riveted or otherwise fastened as at 19, on the spring wound reel means 20. This comprises a reeling and winding shaft 21, having its end portions 22 and 23 projecting through and beyond bearing openings in the ends of the box. The end portion 23 is preferably flat faced, so that it may be used as a tool grip for turning the reel in the event that the winding spring on the interior should become accidentally broken. On the interior of the box and at the right-hand end in Figure 3, the shaft is provided with a ratchet wheel 24, to accommodate a detent or pawl 25 formed as a part of a trip lever 26, the latter pivotally mounted as at 27, on a hanger bracket. The lever is provided at its actuating end with a press-button 28, and the latter is operable through an opening in the top of the tool box. The button is conveniently accessible and is normally held in a projected position by a retaining spring 29 anchored on the box as at 30. The numeral 31 designates a coiled spring which is attached at one end, as at 32, to the shaft 21 and anchored at its opposite end, as at 33 to the adjacent end wall of the tool box. The spring is constantly under tension, and its tendency is to rotate the shaft in a direction which winds or coils the apron 14 on the shaft. At the opposite end of the shaft, I provide a confining head 34 whose width is approximately the same as the combined widths of the ratchet wheel 24 and spring 31. Thus, the latter means provides a head arrangement at one end of the shaft, and the part 34 provides a head at the opposite end, to facilitate uniform winding and coiling of the apron thereon.

Normally, the apron with the tools contained in the various pockets, is wound on the reeling shaft and is held by the spring means 31. By opening the lid or door 8, access is had to the hand-grip 18, whereupon the apron may be reeled out against the tension of the spring. As the apron is pulled out in a step-by-step manner, the pawl and ratchet means comes into play to hold the apron in any given or set position desired. When it is desired to return the apron, the press-button is depressed and the latch means is released and the spring comes into play to rewind the apron in an obvious manner.

Although the invention is particularly shown and described as having to do with a mechanic's or machinist's tool box, it is obvious that it lends itself to use in other fields of endeavor, as for example, an instrument box for dentists and others, and so on and so forth.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A tool box of the class described comprising a box having a lidded opening, a carrying handle exteriorly mounted on said box, a rotatable reel mounted for rotation in said box, said reel embodying a shaft mounted for rotation at its opposite ends in bearings provided in corresponding ends of said box, heads fixed on the respective end portions of the shaft and operable within the confines of said box, said reel being adapted to serve to accommodate an apron and to facilitate uniform winding of the apron on the shaft between said heads, a flexible apron secured at one end to said shaft and wound on said shaft between said heads, one of said heads having peripheral teeth and constituting a ratchet wheel, a complemental spring attached at one end to the ratchet wheel, surrounding said shaft, and attached at its opposite end to an adjacent end of said box, said spring being interposed between the ratchet wheel and the adjacent end of the box, a push-button mounted on said box, and a pivotally mounted operating lever between the push-button and ratchet wheel and including a pawl engaging the ratchet teeth on said ratchet wheel.

2. In a tool box construction of the class described, a box means, apron accommodating and winding reel means in the box means, said reel means comprising a shaft having its outer end portions extending through and beyond bearing openings in said box means, one extending end portion being flat faced to accommodate a wrench or the like which may be employed as an emergency crank for turning the shaft from the outside of the box means, a ratchet wheel in said box means fastened on one end of the shaft and in spaced parallelism to an adjacent wall of the box means, a return spring coiled around the shaft and attached at one end to the shaft and having its opposite end attached to the adjacent wall of the box means, said spring being interposed between said wall and ratchet wheel, a head on the interior of the box means secured to the opposite end of the shaft, a flexible apron attached at its inner end to said shaft and windable on the shaft between the head and ratchet wheel, a push-button mounted for operation on said box means, a lever, said lever being pivoted in the box means, said push-button being connected to the lever, said lever being provided with a detent, and said detent constituting a pawl and being releasably engageable with the teeth of said ratchet wheel.

3. In a tool box construction of the class shown and described, a box provided in one side with a lidded opening, a shaft having its major portion confined in said box and having its end portions operable for rotation in bearing openings provided therefor in end portions of said box, a ratchet wheel in said box fastened on one end of the shaft and situated in spaced parallelism to an adjacent wall of the box, a return spring coiled around said one end of the shaft and attached to said one end and also attached to the adjacent wall of the box, said spring being interposed between said wall and ratchet wheel, a head on the opposite end portion of the shaft and confined in said box, said head being of a thickness corresponding to the combined thicknesses of the coiled spring and complemental ratchet wheel, an apron having an inner end portion fastened to and windable on said shaft, said apron having its marginal edges situated for guided operation between the head on the one hand and the ratchet wheel on the other hand, a lever on the interior of the casing pivotally mounted between its ends, a push-button connected with one end of the lever and operable through an opening in said box, said lever at its opposite end having a lateral pawl, said pawl being engageable with the teeth of said ratchet wheel, said lever being at right angles to said ratchet wheel, and a return spring anchored at one end in said box and having its opposite end connected for actuation of said lever and button to normal positions.

JOHN M. MILLER.

REFERENCES CITED

The following references are of record in the file of this patent:

UNITED STATES PATENTS

| Number | Name | Date |
| --- | --- | --- |
| 67,459 | Starritt | Aug. 6, 1867 |
| 343,521 | Inghram | June 8, 1886 |
| 807,965 | Rice | Dec. 19, 1905 |
| 1,117,960 | McIntyre | Nov. 17, 1914 |